United States Patent [19]

Iggulden

[11] Patent Number: 4,933,968
[45] Date of Patent: Jun. 12, 1990

[54] TELEPHONE WITH AUTOMATIC REDIAL OF NUMBER PROVIDED BY INFORMATION OPERATOR'S COMPUTER

[75] Inventor: Jerry R. Iggulden, Santa Clarita, Calif.

[73] Assignee: Donald S. Streck, Ojai, Calif.

[21] Appl. No.: 334,337

[22] Filed: Apr. 7, 1989

[51] Int. Cl.$^5$ ............................................. H04M 1/26
[52] U.S. Cl. .................................... 379/216; 379/355; 379/354
[58] Field of Search ............... 379/355, 354, 356, 260, 379/372, 386, 387, 376, 216

[56] References Cited

U.S. PATENT DOCUMENTS

| 3,928,724 | 12/1975 | Byran et al. | 379/89 X |
| 4,593,157 | 6/1986 | Usdan | 379/355 X |

Primary Examiner—James L. Dwyer
Attorney, Agent, or Firm—Donald A. Streck

[57] ABSTRACT

In a telephone having a button for redialing the last number dialed as stored in a last number dialed memory and a telephone number dial, a method of operation for simplifying the obtaining and dialing of unknown numbers from an information telephone operator's computer. The method comprises the steps of: providing digit definition memory means containing pre-defined sample data corresponding to respective ones of the digits 0-9 as spoken by a recording from the telephone operator's computer; and when the telephone is off hook, storing telephone numbers as input to the telephone number dial sequentially into the last number dialed memory; testing to see if either a local information telephone number or a distant information telephone number has been dialed and if not, exiting: sampling voice transmissions on the telephone; comparing samples obtained from the voice transmissions to the contents of the digit definition memory means; if no match is found, returning to sample voice transmissions, otherwise continuing; storing a digit corresponding to a match into its proper sequential position in the last number dialed memory; testing to see if seven digits have been recognized in the voice transmissions and stored into the last number dialed memory and going back to sample voice transmissions if not, otherwise exiting; and continuously testing to see if last number redial has been requested and outputting the contents of the last number dialed memory as a dialing sequence on the telephone if it has.

11 Claims, 2 Drawing Sheets

TELEPHONE WITH AUTOMATIC REDIAL OF NUMBER PROVIDED BY INFORMATION OPERAOR'S COMPUTER

Backgroung of the Invention:

This invention relates to telephones having the capability of redialing the last number dialed and, more particularly, in a telephone having redial capability for redialing the last number dialed as stored in a last number dialed memory to the improvement for simplifying the obtaining and dialing of unknown numbers from an information telephone operator's computer comprising digit definition memory means containing pre-defined sample data corresponding to respective ones of the digits 0-9 as spoken by a recording from the telephone operator's computer; call recognition logic for recognizing the contents of the last number dialed memory as the number of an information operator; sample logic for contionuously sample voice on the telephone and for developing sample data related thereto; and, voice recognition logic for comparing the sample data from the sample logic to the predefined sample data in the digit definition memory means for storing an associated digit into the last number dialed definition memory means and for storing an associated digit into the last number dialed memeory in its proper position when a match is found between the sample data from the sample logic and a pre-defined sample data in the digit definition memory means whereby when the telephone is used to call an information operator a number provided by the operator can be dialed by initiating the redial capability of the telephone.

Virtually everyone has gone through the usually unpleasant and inconvenient task of obtaining an unknown telephone number from "information". The problems associated therewith are particularly acute at a public telephone. The average person seeking an unknown telephone through information at a public telephone is usually without pencil and/or paper with which to write the number down. Unless there is dust or film on some nearby surface into which the number can be written with a finger, the user must rely upon memory. Unfortunately, except for a few persons with exceptional memory retention for numerical sequences, most persons have difficulty remembering a seven number sequence such as a telephone number. Thus, unless the number is an easily remembered sequence such as 1234, it is not uncommon to forget the number half way through dialing it and have to recall information to get the number once again. If the number is remembered and is busy, it is probably forgotten by the time it is tired again a few minutes later.

Wherefore, it is the object of the present invention to provide a telephone which will recognize and remember the numbers of a telephone number obtained from the information opertor and then redial it automatically at the touch of a button.

Other objects and benefits of the invention will become apparent from the description which follows hereinafter when taken in conjunction with the drawing figures which accompany it.

Summary:

The foregoing object has been achieved in a telephone having redial capability for redialing the last number dialed as stored in a last number dialed memory by the method of the present invention for simplifying the obtaining and dialing of unknown numbers from an information telephone operator's computer comprising the steps of, providing digit definition memory means containing predefined sample data corresponding to respective ones of the digits 0-9 as spoken by a recording from the telephone operator's computer; recognizing the contents of the last number dialed memory as the number of an information operator; when the contents of the last number dialed memory is the number of an information operator, continuously sampling voice on the telephone and developing sample data related thereto; comparing the sample data from the sample logic to the pre-defined sample data in the digit definition memory means; storing an associated digit into the last number dialed memory in its proper position when a match is found between the sample data from the sample logic and a pre-defined sample data in the digit difinition memory means; and, when the telephone is used to call an information operator, thereafter dialing a number provided by the operator by initiating the redial capability of the telephone.

The preferred method also comprises the steps of providing a numerical display and displaying the contents of the last number dialed memory on the numerical display.

Additionally in the preferred method, the last number dialed memory contains at least eleven digit position and additionally there are the steps of clearing the entire last number dialed memory before storing digits therein if the number dialed to call the information operator was 411 and clearing only the lower seven digit positions of the last number dialed memory before storing digits therein if the number dialed to call the information operator was 1+area code+555xxxx.

Figure 2:
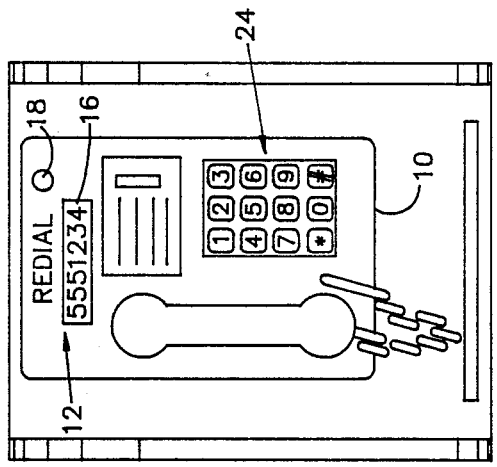
FIG. 2 is a drawing of a public telephone having the present invention incorproated therein.

DESCRIPTION OF THE PREFERRED EMBODIMENT:

Many telephones available today include a last number redial capability. Thus, having once dialed a number, if it is busy the caller can call back at a later time by simple push of a button. This is to say that the accomplishment of storing a telephone number in memory and employing it at a later time to dial by pulses or tones is a technology well known to those skilled in the telephone art which needs no further explanation.

The art of voice recognition as implement using digital computers is a slowly emerging technology. While much research has gone into voice recognition, it has limited applicability due to its usual computer intensive nature. The big factor is whether the voice respone unit (VRU) can recognize words in general (i.e. from any user) or must be "taught" the voice characteristics of a particular user. Most semicommercially successful VRU work on the latter principle. For example, a voice response operating dictating machine may require that the intended user sit down and recite a list of terms to be recognized into VRU to teach is the user's voice characteristics for those terms. The VRU cannot recognize non-defined terms. Should the user have a cold, or the like, so that the user's voice characteristics are altered, the VRU may not be able to recognize even pre-defined terms.

Recently, at last one high technology toy manufacturer has introduced a toy into the marketplace which can recognize a few simple words such as "yes" and "no" from any speaker. The actions based on the decision are not critical; so, if the VRU incorporated therein makes a mistake, it is not of major importance. The toy is basically a teaching tool and the child user answers questions from the unit such as "Do you want to answer now?" (answerable with recognizable "yes" and "no"). If the child says yes, the question is posed in a fashion such as "Is it the bear?" so that it is, again, answerable with recognizable "yes" and "and".

The present invention is based on the proposition (and fact) that virtually all information operators in the United States now employ a computer to output the number requested by the calling party. Additionally, and most inportant for the inexpensive and practical implementation of this invention, the computer in each cases employs pre-stored digits—as recorded by the same woman. Thus, the digits employed and transmitted to the caller comprise no more than twenty to thirty (accounting for up and down deflections applied depending on the position of the digit in the total telephone number). This sequence of digits can easily be "taught" to a very simple and inexpensive VRU. Thus, the present invention as will now be described in detail becomes a practical and inexpensive solution to the problem posed.

While the description which follows hereinafter is directed to the incorporation of this invention into a public telephone and includes a display for indicating the telephone number as well, as those skilled in the art will recognize, the display is a matter of preference only and can be omitted without affecting the present invention and the benefits thereof in any significant way. Likewise, the essential elements could be incorporated into a home or office telephone to attain the same benefits. Finally, as those skilled in the art will also readily recognize, while a separate REDIAL button is shown in the drawing figures, one of the buttons on the dial pad of the telephone (e.g. the "*" or "#" button) could be employed, if desired.

Figure 3:
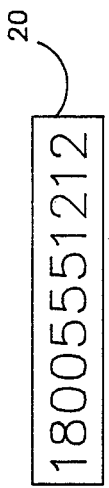
FIG. 3 is a drawing of the organization of the memory employed to store a telephone number for redialing in the present invention.
Figure 1:
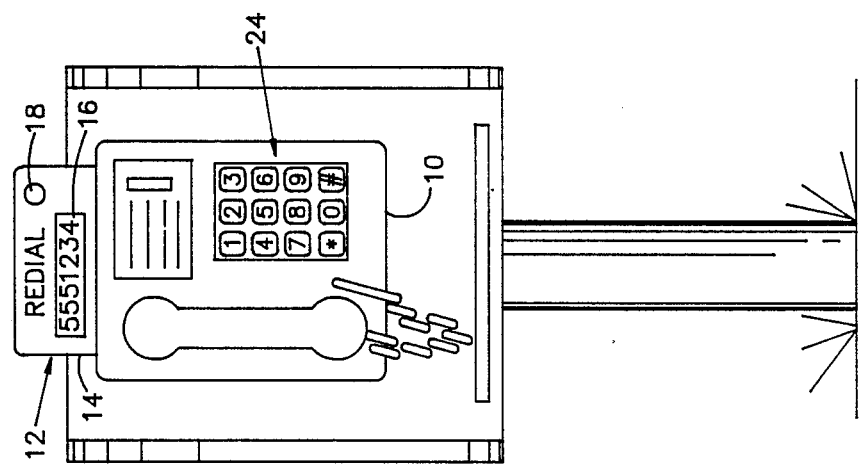
FIG. 1 is a drawing of a public telephone having the present invention attached thereto as a retrofit item.

A public telephone 10 incorporating the present invention 12 as an add-on modification in the box 14 is shown in Figure 1. A public telephone 10 incorporating the present invention, as generally indicated at 12, in the telephone 10 is shown in FIG. 2. In these two drawing figures, the elements of the present invention 12 which can be seen are the display 16 and the REDIAL button 18. As depicted in FIG. 3, the invention 12 includes a last number dialed memory 20 having positions to hold eleven digits. When completely filled with a long distance number, the most significant digit (MSD) is the access code "1" which is followed by a three digit area code. The seven least significant digits (LSDs) comprise the seven digit telephone number.

Figure 4:
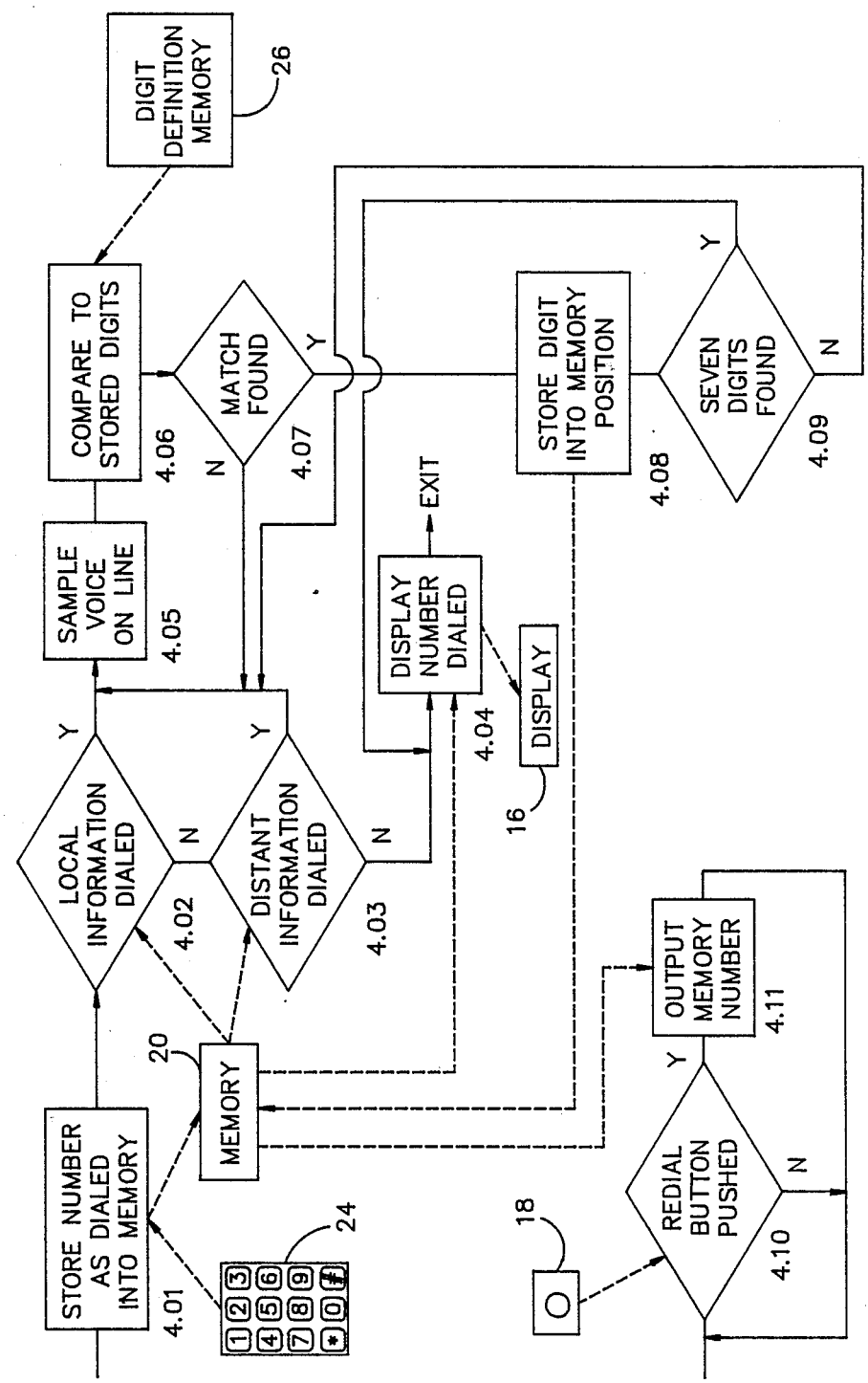
FIG. 4 is a combined functional block diagram and logic flowchart for implementing the present invention in its preferred embodiment.

The operation of the present invention as incorporated into the circuitry of a telephone 10 in its preferred embodiment is depicted in the combined functional block diagram and logic flowchart of FIG. 4. While FIG. 4 depicts one manner of implementing the present invention, others within th scope and spirit of the invention will become apparent to those skilled in the art from the teachings of the drawing and the detailed description which follows. When the telephone 10 is taken "off-hook" and a dial tone is received, the logic 22 of FIG. 4 is activated. As the user inputs a telephone number through the dial pad 24, the digits are stored in the memory 20 at block 4.01 in the sequence as indicated in FIG. 3. Note that all eleven digits may not be input. A local call will require seven, a toll call will require eight, a long distance call (excluding international calls requiring additional access codes and country codes) will require the full eleven, and local information calls to "411" will require only three. Once the number of digits required to call a number have been input, the logic 22 moves to decision blocks 4.02 and 4.03 where it is determined if an information call has been made. Decision block 4.02 looks for "411" in the memory 20 while decision block 4.03 looks for "555" in the three MSDs of the lower seven LSDs. If an information call has not been dialed, at block 4.04 the logic 22 outputs the number dialed (as obtained from the memory 20) to the display 16 and then exits. The display of the number dialed on the display 16 is a convenience feature for confirmation of the number to the caller only.

If an information call is progress, the logic 22 moves to the VRU logic represented by blocks 4.05-4.07 and digit definition memory 26. This aspect of the present invention is well known to those skilled in the VRU art and, therefore, in the interest of simplicity and the avoidance of redundancy, these blocks will only be described in broad functional terms. At block 4.05, the voice on the telephone line (not shown) is sampled on continual basis. The sampled data is then compared at block 4.06 to the pre-defined digit definitions as contained in and obtained from the digit definition memory 26. If a match is not then found at decision block 4.07, the logic 22 returns to block 4.05 to continue sampling. When a match is found at decision block 4.07, the logic moves to block 4.08 where the digit is stored into it correct position in the memory 20. Before the first digit is stored into the memory 20, the entire memory 20 is cleared if it contains "411" and the seven LSDs are cleared if it contains 1+area code+555xxxx. When a digit is stored in the memory 20, the logic 22 checks at decision block 4.09 to see if all seven digits have been found. If they have, the logic returns to block 4.04 where the number is again displayed on the display 16 and the logic 22 exits. Note again that the display 16 is a convenience feature only. In this instance, it provides the number to the user in a displayed and retained form so that it can be copied down for later use if desired without having to copy it down "on the run" as it is spoken by the recording from the computer. If all the seven digits have not been detected, the logic 22 returns to block 4.05 to continue sampling. Note that the logic 22 as implemented is a "fail safe" type of logic in that it does not tie up the telephone 10 in the event that all seven digits are not detected for some reason or should some other condition cause the logic 22 not to complete its task (or otherwise malfunction). The entire capability of the telephone 10 can still be employed (with the exception of the last number redial feature which may be partially changed) at any time. Likewise, the storing of digits into the memory 20 on a random basis if digits are recognized at any time will not affect a conversation in progress.

Whenever the telephone 10 is off-hook the loop of decision block 4.10 and block 4.11 is also active. Decision block 4.10 watches the REDIAL button 18. If it is pushed, the logic 22 moves to block 4.11 where the number presently stored in the memory 20 is output in dial form (i.e. tone or pulses) as appropriate for the telephone service being accessed by the telephone 10. Note that there is no way for the logic 22 to know when a local information call "411" has resulted in a number from the information computer which is a toll call and requires a preceding "1". The caller must simply input the "1" from the dial pad 24 and then depress the REDIAL button 18 to output the balance of the number from the memory 20. Other than that, the memory 20 should contain the access code "1" followed by the area code accessed by the information call followed by the seven digits provided by the information computer.

While the present invention as descirbed hereinbefore has been shown with specificity as being incorporated into a public telephone and as add-on thereto, those skilled in the art will recognize that other configurations could be made of the present invention. For example, the invention could be made as a stand alone device which is connected in parallel to the "tip" and "ring" lines into a standard telephone in much the same way as a telephone answering machine is placed in parallel with a standard telephone. Simple "Y" connectors are commercially available to accomplish such parallel connections. The invention could also be accomplished as a software program within a computer such as a so-called "personal computer" or "PC" with connection in parallel to a standard telephone in the usual manner with a suitable hardware interface as is known in the art. The invention could also be manufactured and sold as a stand-alone article in the so-called "consumer electronics" market intended for acoustic coupling to a standard telephone handset. When an information call was made, the user would place the call and describe the party to be called. The present invention would then be placed over the earpiece of the telephone handset where a microphone contained therein would "hear" the telephone number from the operator's computer. Translation and storage would be substantially as described hereinbefore. The call the number, the invention would then be placed over the mouthpiece of the telephone handset where a small speaker contained therein would transmit the telephone number from the memory as a series of DTMF tones from a DTMF tone generator contained therein representing the telephone number just as if the telephone number had been dialed from a tone dial pad.

Another aspect of the present invention as contemplated by the inventor herein is obtaining the cooperation of the telephone companies supplying information services for the purpose of improving service to their subscribers. For this purpose, the telephone company could include within the computer transmission of each telephone number a burst of the same telephone numbers in another form such as DTMF, for example. The short burst could precede or follow the vocalized numerals. It could also be a binary bit stream on a carrier frequecy (preferably above normal human hearing range). The burst would, of course, be easier and less costly (by way of equipment cost to the user) to interpret for purpose of the present invention.

In any event, it is the inventor's intent that such alternate approaches, and in particular the use of a supplemental information burst within the voice stream from the information operator's computer be included within the scope and spirit of the claims which follow hereinafter despite what might otherwise be considered as limiting language.

Wherefore, having thus described my invention, what is claimed is:

1. In a telephone system having redial capability for redialing the last number dialed as stored in a last number dialed memory, the improvement for simplifying the obtaining and dialing of unknown numbers from an information telephone operator's computer comprising:
   (a) digit definition memory means containing pre-defined sample data corresponding to respective ones of the digits 0-9 as spoken by a recording from the telephone opeator's computer;
   (b) call recognition logic for recognizing the contents of the last number dialed memory as the number of an information operator;
   (c) sample logic for continuously sampling voice on the telephone and for developing sample data related thereto; and
   (d) voice recognition logic for comparing said sample data from said sample logic to said pre-defined sample data in said digit definition memory means and for storing an asociated digit into the last number dialed memory in its proper position when a match is found between said sample data from said sample logic and a said pre-defined sample data in said digit definition memory means, the last number dialed memory containing at least eleven digit positions and said voice recognition logic including logic for clearing the entire last number dialed memory before storing digits therein if the number dialed to call the information operator was 411 and for clearing only the lower seven digit positions of the last number dialed memory before storing digits therein if the number dialed to call the information operator was 1+area code+555xxxx whereby when the telephone is used to call an information operator a number provided by the operator can be dialed by initiating the redial capability of the telephone.

2. The improvement to a telephone of claim 1 and additionally comprising:
   (a) a numerial display; and,
   (b) display logic for displaying the contents of the last number dialed memory on said numerical display.

3. The improvement to a telephone of claim 1 wherein:
   said voice recognition logic includes logic for comparing said sample data from said sample logic to said pre-defined sample data in said digit definition memory means only when the contents of the last number dialed memory is the number of an information operator.

4. In a telephone having redial capability for redialing the last number dialed as stored in a last number dialed memory, the method of operation for simplifying the obtaining and dialing of unknown numbers from an information telephone operator's computer comprising the steps of:
   (a) providing digit definition memory means containing pre-defined sample data corresponding to respective ones of the digits 0-9 as spoken by a recording from the telephone operator's computer;
   (b) recognizing the contents of the last number dialed memory as the number of an information operator;

(c) when the contents of the last number dialed memory is the number of an information operator, continuously sampling voice on the telephone and developing sample data related thereto;

(d) comparing the sample data from the sample logic to the pre-defined sample data in the digit definition memory means;

(e) storing an associated digit into the last number dialed memory in its proper position when a match is found between the sample data from the sample logic and a pre-defined sample data in the digit definition memory means; and, (f) when the telephone is used to call an information operator, thereafter dialing a number provided by the operator by initiating the redial capability of the telephone; wherein the last number dialed memory contains at least eleven digit positions and additionally comprising the steps of, (g) clearing the entire last number dialed memory before storing digits therein if the number dialed to call the information operator was 411; and, (h) clearing only the lower seven digit positions of the last number dialed memory before storing digits therein if the number dialed to call the information operator was 1+area code+555xxxx.

5. The method of claim 4 and additionally comprising the steps of:

(a) providing a numerical display; and, (b) displaying the contents of the last number dialed memory on the numerical display.

6. In a telephone having a button for redialing the last number dialed as stored in a last number dialed memory and a telephone number dial, the method of operation for simplifying the obtaining and dialing of unknown numbers from an information telephone operator's computer comprising the steps of:

(a) providing digit definition memory means containing pre-defined sample data corresponding to respective ones of the digits 0-9 as spoken by a recording from the telephone operator's computer; and when the telephone is off hook, (b) storing telephone numbers as input to the telephone number dial sequentially into the last number dialed memory;

(c) testing to see if either a local information telephone number or a distant information telephone number has been dialed and if not, exiting;

(d) sampling voice transmissions on the telephone;

(e) comparing samples obtained from the voice transmissions to the contents of the digit definition memory means;

(f) if no match is found, returning to step (d), otherwise continuing;

(g) storing a digit corresponding to a match into its proper sequential position in the last number dialed memory;

(h) testing to see if seven digits have been recognized in the voice transmissions and stored into the last number dialed memory and going to step (d) if not, otherwise exiting and (i) continuously testing to see if last number redial has been requested and outputting the contents of the last number dialed memory as a dialing sequence on the telephone if it has.

7. The method of claim 6 and additionally comprising the step of:

before exiting, displaying the contents of the last number dialed memory on a numerical display.

8. In a telephone system, the improvement for simplifying the obtaining and dialing of unknown numbers from an information telephone operator's computer comprising:

(a) digit definition memory means containing pre-defined sample data corresponding to respective ones of the digits 0-9 as transmitted by a recording from the telephone operator's computer;

(b) last number dialed memory means for receiving and storing a telephone number as dialed by a user of the telephone system, said last number dialed memory means containing at least eleven digit positions;

(c) call recognition logic means for recognizing the contents of said last number dialed memory means as the number of an information operator, said digit recognition logic means including logic for clearing the entire said last number dialed memory means before storing digits therein if the number dialed to call the information operator was 411 and for clearing only the lower seven digit positions of said last number dialed memory means before storing digits therein if the number dialed to call the information operator was 1+area code+555xxxx;

(d) sample logic means for continuously sampling transmissions on the telephone system and for developing sample data related thereto;

(e) digit recognition logic means for comparing said sample data from said sample logic means to said pre-defined sample data in said digit definition memory means and for storing an associated digit into said last number dialed memory means in its proper position when a match is found between said sample data from said sample logic means and a said pre-defined sample data in said digit definition memory means; and, (f) memory dialing means for using the contents of said last number dialed memory means to dial the telephone system whereby when the telephone system is used to call an information operator a number provided by the operator can be dialed automatically.

9. The improvement to a telephone of claim 8 and additionally comprising:

(a) a numerical display; and, (b) display logic means for displaying the contents of said last number dialed memory means on said numerical display.

10. The improvement to a telephone of claim 8 wherein:

said digit recognition logic means includes logic for comparing said sample data from said sample logic means to said pre-defined sample data in said digit definition memory means only when the contents of said last number dialed memory means is the number of an information operator.

11. The improvement to a telephone of claim 8 and additionally comprising:

(a) microphone means connected to said sample logic means for continuously sampling transmissions on an earpiece of a handset of the telephone system; and (b) speaker means and DTMF tone generating means connected to each other and said memory dialing means for dialing the telephone system by inputting DTMF tones corresponding to a telephone number being dialed into a mouthpiece of said handset.

* * * * *